United States Patent [19]

Tanaka

[11] 3,827,052

[45] July 30, 1974

[54] SIMULTANEOUS RADIO COMMUNICATION SYSTEM BETWEEN TWO STATIONS

[75] Inventor: Saburo Tanaka, Izumi, Japan

[73] Assignee: Sendai Television Broadcasting Corporation, Miyagi-ken, Japan

[22] Filed: Dec. 6, 1972

[21] Appl. No.: 312,778

[30] Foreign Application Priority Data

Dec. 8, 1971 Japan ................................ 46-99646
Apr. 8, 1972 Japan ................................ 47-38982

[52] U.S. Cl. .................... 343/178, 325/15, 343/179
[51] Int. Cl. ............................................... H04l 5/22
[58] Field of Search ........ 325/15, 22; 343/178, 179; 179/15.55 T

[56] References Cited

UNITED STATES PATENTS

| | | | |
|---|---|---|---|
| 1,585,591 | 5/1926 | Lowy | 343/178 |
| 2,498,635 | 2/1950 | Bailey | 343/178 |
| 2,650,949 | 9/1953 | Veaux | 179/15.55 T |
| 2,987,614 | 6/1961 | Roberts et al. | 179/15.55 T |
| 3,150,374 | 9/1964 | Sunstein et al. | 179/15.55 T |

*Primary Examiner*—Albert J. Mayer
*Attorney, Agent, or Firm*—Marshall & Yeasting

[57] ABSTRACT

A simultaneous radio communication system comprising first and second radio stations adapted to transmit first and second radio waves of the same radio channel and receive the transmitted second and first radio waves, in which the first and second radio waves are interrupted waves interrupted in opposite phases at the same period; the on-state periods of the transmitted first radio waves include time compressed third information of first information to be transmitted; the on-state periods of the transmitted second radio waves include time compressed fourth information of second information to be transmitted; and the first and second radio stations have means for time expansion of the time compressed fourth and third information from the second and first transmitted radio waves to obtain sixth and fifth information corresponding to the second and first information respectively.

1 Claim, 9 Drawing Figures

SIMULTANEOUS RADIO COMMUNICATION SYSTEM BETWEEN TWO STATIONS

BACKGROUND OF THE INVENTION

1. Field of the Invention

This invention relates to a radio communication system, and more particularly to a simultaneous radio transmission and reception system which is adapted so that information is simultaneously transmitted and received between two radio stations.

2. Description of the Prior Art

With conventional simultaneous radio communication systems of this kind, two radio stations simultaneously transmit radio waves of different radio frequency channels so that two radio frequency channels are required for simultaneous information transmission and reception between two radio stations. Therefore, it has been desired to realize a system which employs only one radio frequency channel for simultaneous information transmission and reception between two radio stations.

SUMMARY OF THE INVENTION

Accordingly, the present invention is to provide a novel simultaneous radio transmission and reception system adapted for simultaneously transmitting and receiving information between two stations with one radio frequency channel.

DESCRIPTION OF THE PREFERRED EMBODIMENTS

With reference to the drawings, one example of this invention will hereinafter be described as being applied to a simultaneous radiotelephone system.

Figure 1:
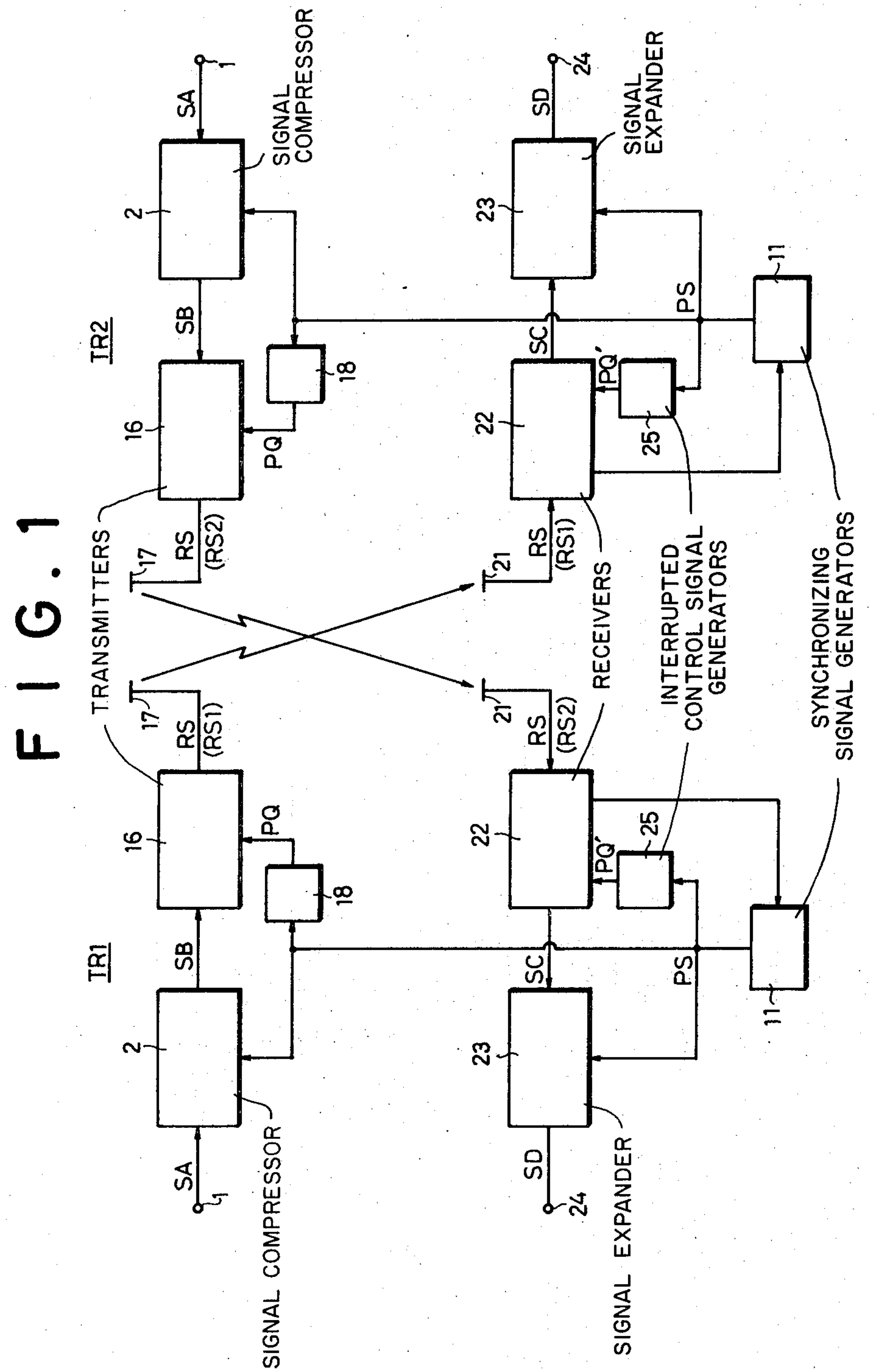
FIG. 1 is a block diagram showing one example of the simultaneous radio transmission and reception system of this invention.

In FIG. 1, reference characters TR1 and TR2 indicate generally radio stations of the following construction.

An aural signal SA from an aural signal source 1 is supplied to a time base compressor 2, from which is derived an aural signal SB produced by time base compression of the aural signal SA.

Figure 2:
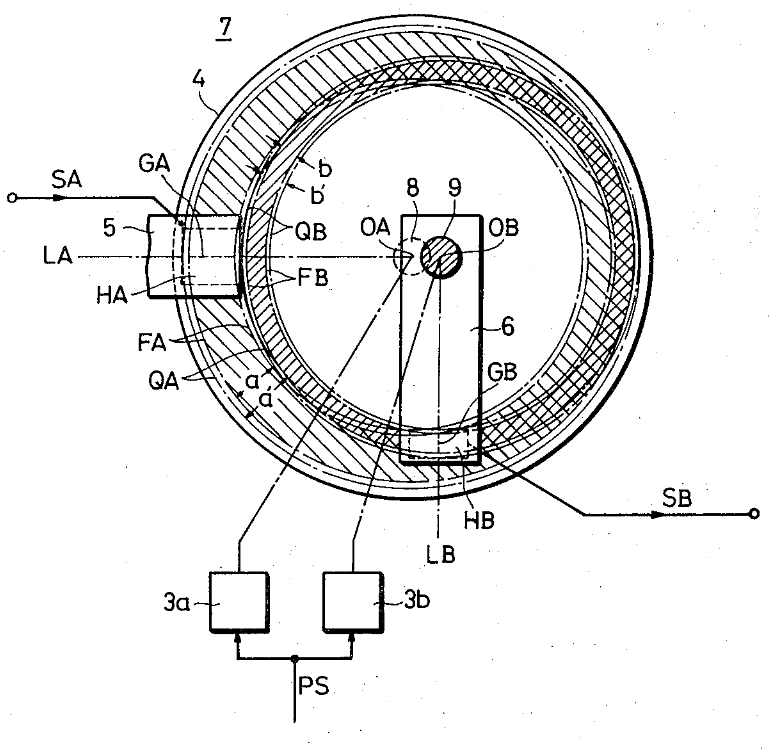
FIGS. 2 and 3 are respectively a schematic diagram showing one example of each of a time base compressor and a time base expander employed in the example of FIG. 1 and a side view showing their principal parts.
Figure 3:
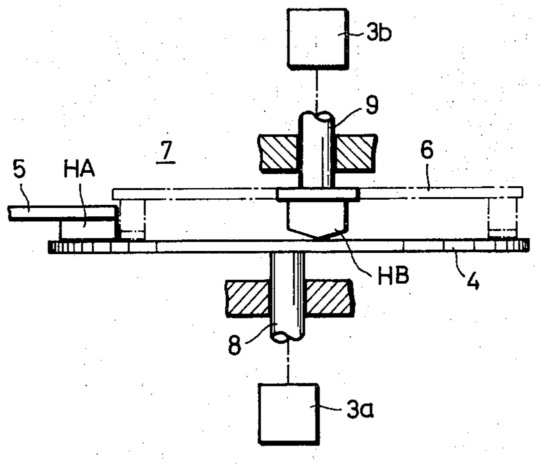

The time base compressor 2 has the following construction. As shown in FIGS. 2 and 3, it comprises a magnetic recording and reproducing device 7 having a rotary magnetic disc 4 coupled with a rotation driving source 3*a*, a fixed magnetic head HA mounted on the free end of a fixed support arm 5 and a rotary magnetic head HB mounted on the free end of a rotary support arm 6 coupled with a rotation driving source 3*b*. In this case, the fixed magnetic head HA is disposed in contact with or adjacent to the rotary magnetic disc 4 with its air gap GA aligned with a radial reference line OA-LA passing through a rotary shaft 8 of the rotary magnetic disc 4 in such a manner that the air gap GA may form a rotational track FA of a width $a$ on the rotary magnetic disc 4 and that, when viewed from the rotary magnetic disc 4, the gap GA may form a cubic rotational track QA of a predetermined width $a'$ about the rotary shaft 8. While, the rotary magnetic head HB is mounted on the rotary support arm 6 so that its air gap GB is aligned with a radial line OB-LB passing through a rotary shaft 9 of the rotary support arm 6. The rotary shaft 9 of the rotary support arm 6 is disposed eccentrically of the rotary shaft 8 of the rotary magnetic disc 4 with the rotary magnetic head HB disposed in contact with or adjacent to the rotary magnetic disc 4 on a line diametrically opposite to the reference line OA-LA in such a manner that, when viewed from the rotary magnetic disc 4, the air gap GB of the rotary magnetic head HB may form a cubic rotational track QB of a width $b'$ with its outer periphery crossing the cubic rotational track QA of the fixed magnetic head HA in its region of the width $a'$ at those areas where the fixed magnetic head HA does not lie and that the air gap GB may form a rotational track FB of a width $b$ on the rotary magnetic disc 4 without collision of the rotary magnetic head HB with the fixed magnetic head HA. In this case, however, the center of the rotational track FB of the air gap GB of the rotary magnetic head HB bears such a relation to that of the track FA of the gap GA of the fixed magnetic head HA that the track FB is displaced towards the outer periphery of the track FA on the opposite side from the fixed magnetic head HA.

The rotary magnetic disc 4 and the rotary magnetic head HB are respectively driven clockwise and anticlockwise at the same rotational period T by the driving sources 3*a* and 3*b* which are controlled by a synchronizing signal PS derived from a synchronizing signal generator circuit 11 described later. Under such condition, when the aural signal SA is supplied to the fixed magnetic head HA, it is recorded on the rotary magnetic disc 4 while forming the same track as the rotational track FA and it is reproduced by the rotary magnetic head HB and the reproduced signal is obtained as the time base compressed aural signal SB. The time base compressed aural signal SB is derived from the aural signal SA by the magnetic recording and reproducing device 7 in the following manner.

Figure 4:
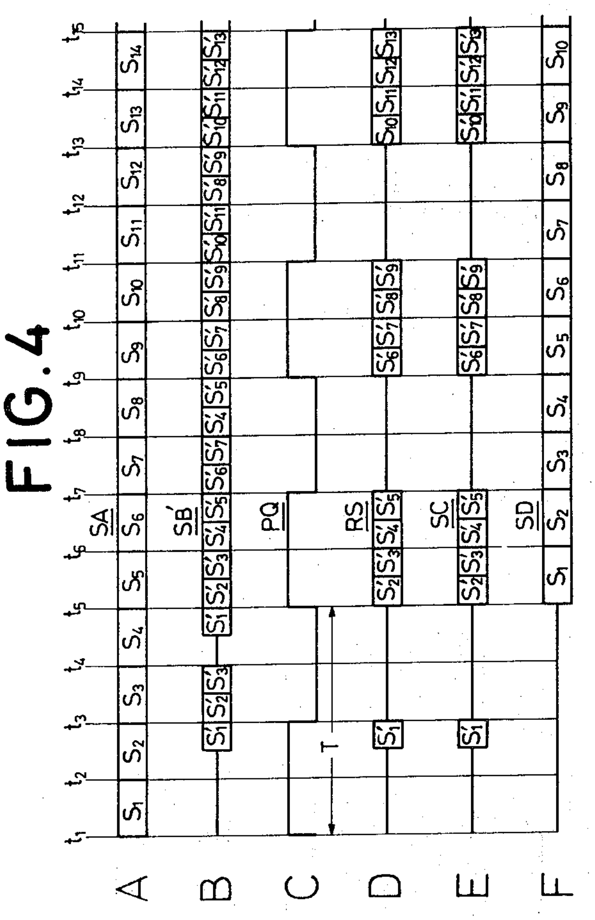
FIGS. 4 and 5 are signal arrangement diagrams, for explaining the present invention.

The rotational track FA formed by the fixed magnetic head HA on the rotary magnetic disc 4 is equally divided in a clockwise direction into sections $D_1$, $D_2$, $D_3$ and $D_4$. Assume that the rotary magnetic disc 4 is driven at a constant speed with the rotational period T from an instant $t_1$ when the beginning of the section $D_1$ lies on the reference line OA-LA. Instants when the beginnings of the sections $D_2$, $D_3$, $D_4$, $D_1$, $D_2$, . . . sequentially cross the reference line OA-LA from the instant $t_1$ are taken as $t_2$, $t_3$, $t_4$, $t_5$, . . . (the time between $t_1$ and $t_2$, between $t_2$ and $t_3$, between $t_3$ and $t_4$, . . . is T/4). Assume that the aural signal SA is obtained from the instant $t_1$ as shown in FIG. 4A. Signal portions of the signal SA between the instants $t_1$ and $t_2$, between $t_2$ and $t_3$, between $t_3$ and $t_4$, . . . are taken as $S_1$, $S_2$, $S_3$, . . . respectively. It will be apparent that the signal portions $S_1$, $S_2$, $S_3$, $S_4$, $S_5$, $S_6$, . . . are sequentially recorded by the fixed magnetic head HA in the sections $D_1$, $D_2$, $D_3$, $D_4$, $D_1$, $D_2$, . . . on the track FA of the rotary magnetic disc 4.

Assume that the signal portions $S_1$, $S_2$, $S_3$, $S_4$, $S_5$, $S_6$, . . . are sequentially recorded in the sections $D_1$, $D_2$, $D_3$, $D_4$, $D_1$, $D_2$, . . . on the track FA of the rotary magnetic disc 4, that the fixed magnetic head HA is not present, that the center OB of the rotary shaft 9 of the rotary magnetic head HB lies on that OA of the rotary shaft 8 of the rotary magnetic disc 4, that the radius of the track formed by the air gap GB of the rotary magnetic head HB on the rotary magnetic disc 4 is equal to that of the track FA formed by the fixed magnetic head HA and that the rotary magnetic head HB lies at a rotational position spaced 90° apart from the refernece line OA-LA in an anticlockwise direction at the instant $t_1$. In such a case, the rotary magnetic head HB scans the sections $D_2$ and $D_3$, $D_4$ and $D_1$, $D_2$ and $D_3$, . . . of the track FA on the rotary magnetic disc 4 between the instants $t_1$ and $t_2$, between $t_2$ and $t_3$, between $t_3$ and $t_4$, so that a reproduced signal (identified by SB′) derived from the rotary magnetic head HB is obtained as a signal having such an arrangement as shown in FIG. 4B which consists of a non-signal portion, a signal portion $S_1'$ reproduced from the signal portion $S_1$, continuous signal portions $S_2'$ and $S_3'$ reproduced from the continuous signal portions $S_2$ and $S_3$, the signal portion $S_1'$ reproduced from the signal $S_1$, the continuous signal portions $S_2'$ and $S_3'$ reproduced from the continuous signal portions $S_2$ and $S_3$, continuous signal portions $S_4'$ and $S_5'$ reproduced from the continuous signal portions $S_4$ and $S_5$, continuous signal portions $S_6'$ and $S_7'$ reproduced from the continuous signal portions $S_6$ and $S_7$, the continuous signal portions $S_4'$ and $S_5'$ reproduced from the continuous signal portions $S_4$ and $S_5$, the continuous signal portions $S_6'$ and $S_7'$ reproduced from the continuous signal portions $S_6$ and $S_7$, . . . . Accordingly, assuming that the aural signal SA is continuously recorded on the track FA on the rotary magnetic disc 4, that the fixed magnetic head HA is not provided and that the center OB of the rotary shaft 9 of the rotary magnetic head HB lies on that OA of the rotary magnetic disc 4, the signal SB′ derived from the rotary magnetic head HB is obtained as a signal which has a time base one-half times that of the aural signal SA and is time-compressed. The foregoing description has been made on the assumption that the aural signal SA is continuously recorded on the track FA on the rotary magnetic disc 4, that the fixed magnetic head HA is not provided and that the center OB of the rotary shaft 9 of the rotary magnetic head HB lies on that OA of the rotary magnetic disc 4 but, if the fixed magnetic head HA is provided in the above case, the rotary magnetic head HB collides with the head HA and the above-described aural signal SB′ cannot be obtained. With the construction of this invention described previously, however, the center OB of the rotary shaft 9 of the rotary magnetic head HB is eccentric from that OA of the rotary magnetic disc 4 as described previously, so that the rotary magnetic head HB does not collide with the fixed magnetic head HA. Further, due to this eccentricity, the track FB of the rotary magnetic head HB deviates away from that FA of the fixed magnetic head HA on the side of the head HA, and consequently the aural signal SA derived from the rotary magnetic head HB is obtained as the signal SB′ which partly drops out in periods between the instants $t_3$ and $t_5$, between $t_7$ and $t_9$, between $t_{11}$ and $t_{13}$, . . . , as described above. However, even if such dropout exists, such dropout periods are not used, and hence does not present any problem as will become apparent from the following description. Since the air gap GB of the rotary magnetic head HB is not aligned with a line extending radially from the center of the rotary shaft 8 of the rotary magnetic disc 4, the amplitude of the signal SB also fluctuates between the instants $t_1$ and $t_3$, between $t_5$ and $t_7$, between $t_9$ and $t_{11}$, . . . but the amplitude fluctuation can be made negligibly small by minimizing the distance between the centers OA and OB of the rotary shafts 8 and 9. If, however, the amplitude fluctuation presents any problem, it is sufficient to frequency or phase modulate the signal SA previously, supply the frequency or phase modulated signal to the fixed magnetic head HA and insert an amplitude limiter in the system of the rotary magnetic head HB.

The foregoing description has clarified that the time compressed aural signal SB is derived from the aural signal SA by means of the time base compressor 2. The aural signal SB is supplied to a transmitting circuit 16 and thereby converted into radio waves RS of a predetermined frequency channel, which are transmitted through a transmitting antenna 17. In this case, the transmitting circuit 16 is controlled by an interrupted control signal PQ derived from an interrupted control signal generating circuit 18 which is controlled by the synchronizing signal PS as is the case with the driving sources 3*a* and 3*b* of the time base compressor 2, so that the radio waves RS are obtained in the form of interrupted wave. Namely, the interrupted control signal generating circuit 18 derives therefrom such an interrupted control signal PQ as shown in FIG. 4C which is controlled by the synchronizing signal PS to have a width of one-half of the rotating period T of the rotary magnetic disc 4 and the rotary magnetic head HB of the above-described time base compressor 2 and turn on at the aforementioned instants $t_1$, $t_5$, $t_9$, . . . . The transmitting circuit 16 is controlled by the interrupted control signal PQ, so that the radio waves RS from the transmitting circuit 16 are transmitted as interrupted waves (shown by the signal arrangement) such as shown in FIG. 4D which are interrupted by the interrupted control signal PQ. In this case, since the reproduced signal portion $S_1'$ and the continuous reproduced signal portions $S_2'$ to $S_5'$, $S_6'$ to $S_9'$, . . . of the aural signal SB derived from the time base compressor 2 are arranged in the duration periods of the radio waves RS, that is, in the periods between the instants $t_1$ and $t_3$, between $t_5$ and $t_7$, between $t_9$ and $t_{11}$, . . . , the interrupted radio waves RS include the contents of the aural signal SA without dropout and overlapping of the contents. Accordingly, with the construction described above, the aural signal SA is time compressed and transmitted as the interrupted radio waves RS without dropping out and overlapping the contents of the aural signal SA.

The foregoing has clarified one example of the transmission system of each of the radio stations TR1 and TR2. The following will describe one example of their reception system. The reception system is designed such that the transmitted interrupted radio waves RS obtained as described above are received by a receiving antenna 21 and supplied to a receiving circuit 22 to derive therefrom an aural signal SC such as depicted in FIG. 4E which is interrupted in response to the interruption of the transmitted waves RS. In this case, since the interruption of the transmitted waves RS is caused by the interruption of the interrupted control signal PQ shown in FIG. 4C, it will be apparent that the aural signal SC is obtained as an interrupted signal of a signal arrangement including the reproduced signal portion $S_1'$ in the latter half period between the instants $t_2$ and $t_3$, the continuous reproduced signal portions $S_2'$ to $S_5'$ between the instants $t_5$ and $t_7$, the continuous reproduced signal portions $S_6'$ to $S_9'$ between the instants $t_9$ and $t_{11}$, . . . .

The interrupted aural signal SC thus obtained is supplied to a time expander 23 to derive at its output terminal 24 a continuous aural signal SD produced by time expansion of the interrupted aural signal SC. In this case, the time expander 23 is formed with exactly the same magnetic recording and reproducing device as that 7 for the above-described time base compressor 2, so that it is not illustrated. In this case, however, the aural signal SC is supplied to the rotary magnetic head HB. Thus, it will be seen that the aural signal SD derived from the fixed magnetic head HA of the magnetic recording and reproducing device 7 is obtained on the same time base and with the same contents as the aural signal SA in the following manner. Namely, the interrupted aural signal SC shown in FIG. 4E is derived from the aural signal SA shown in FIG. 4A and supplied to the rotary magnetic head HB unlike in the time base compressor 2 and recorded on the rotary magnetic disc 4 and the recorded signal is reproduced by the fixed magnetic head HA. In this case, however, the aural signal SD is obtained from the instant $t_5$ as depicted in FIG. 4F.

The foregoing has clarified one example of the construction of each of the radio stations TR1 and TR2 in the case where the time base compressor 2 and the time expander 23 are each formed with the magnetic recording and reproducing device 7 described previously with regard to FIGS. 2 and 3. However, the time base compressor 2 and the time base expander 23 may also be of such constructions as will hereinbelow be described in connection with FIGS. 6 to 9.

Figure 6:
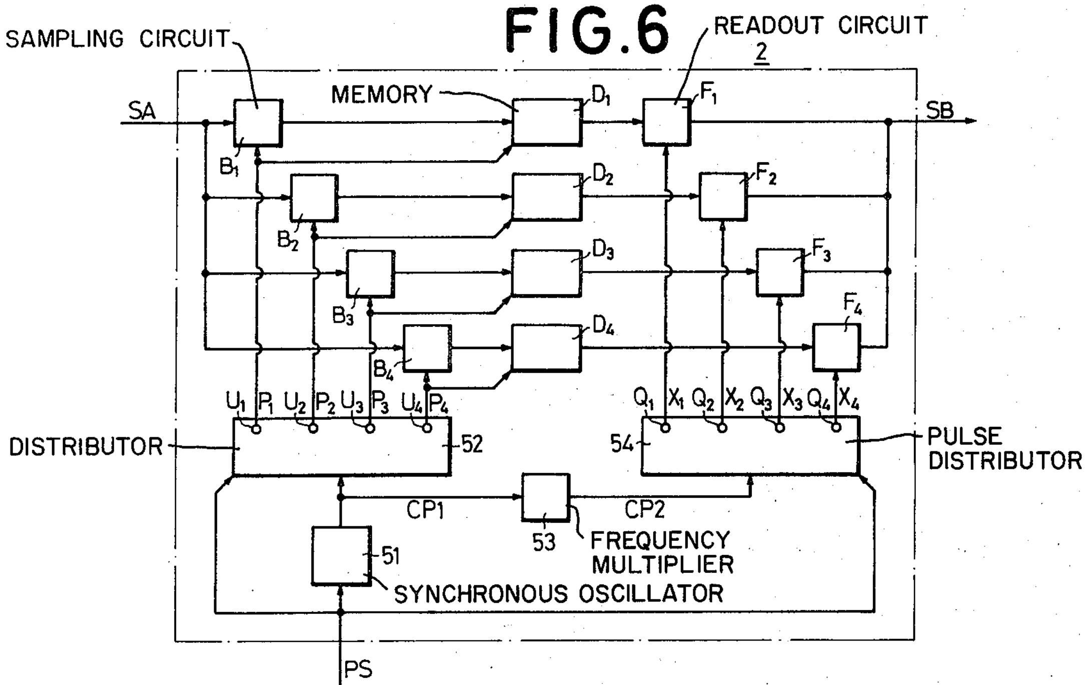
FIG. 6 is a connection diagram illustrating another example of the time base compressor.

FIG. 6 illustrates another example of the time base compressor 2, in which the aural signal SA from the aural signal source 1 is supplied to sampling circuits $B_1$, $B_2$, $B_3$ and $B_4$ shown to be four in all for the sake of brevity. While, a pulse-like synchronizing signal PS such as shown in FIG. 7A, which is derived from the above-described synchronizing signal generator circuit 11, is applied to a synchronous oscillator 51 to derive therefrom a pulse CP1 having a period one-fourth of that T of the synchronizing signal PS as depicted in FIG. 7B, which is supplied to a pulse distributing circuit 52 together with the synchronizing signal PS. The pulse distributing circuit 52 is adapted to derive at its output terminals $U_1$, $U_2$, $U_3$ and $U_4$ pulses $P_1$, $P_2$, $P_3$ and $P_4$ such as shown in FIGS. $7C_1$, $7C_2$, $7C_3$ and $7C_4$ which have the period T and are sequentially displaced T/4 apart in phase. In this case, the pulse $P_1$ is in-phase with the synchronizing signal PS. The pulses $P_i$ ($i = 1, 2, 3$ and 4) are supplied as sampling pulses to the sampling circuits $B_i$. Thus, the aural signal SA is sampled with the sampling pulses $P_i$ and the sampled outputs are stored in memory circuits $D_1$, $D_2$, $D_3$ and $D_4$ which are reset each time the pulses $P_1$, $P_2$, $P_3$ and $P_4$ are obtained respectively. Accordingly, if instants at which the pulse CP1 is obtained are taken as $t_1, t_2, \ldots$ and if signal portions of the aural signal SA at the instants $t_1, t_2, \ldots$ are taken as $S_1, S_2, S_3, \ldots$ respectively, the memory circuits $D_i$ store signal portions $S_i$, $S_{(i+4)}$, $S_{(i+8)}$ in periods between instants $t_i$ and $t_{(i+4)}$, between $t_{(i+4)}$ and $t_{(i+8)}$, between $t_{(i+8)}$ and $t_{(i+2)}$, . . . as illustrated in FIGS. $7D_i$.

Further, the memory circuits $D_1$, $D_2$, $D_3$ and $D_4$ have connected thereto read-out circuits $F_1$, $F_2$, $F_3$ and $F_4$ respectively. While, the pulse CP1 derived from the synchronous oscillator 51 is supplied to a frequency multiplier circuit 53 to derive therefrom a pulse CP2 of a period T/8 such as depicted in FIG. 7E, which is applied to a pulse distributing circuit 54 together with the synchronizing signal PS. The pulse distributing circuit 54 derives at its output terminals $Q_1$, $Q_2$, $Q_3$ and $Q_4$ pulses $X_1$, $X_2$, $X_3$ and $X_4$ of a period T/2 such as shown in FIGS. $7F_1$, $7F_2$, $7F_3$ and $7F_4$ which are sequentially displaced T/8 apart in phase and has a pulse width T/8 respectively. In this case, the pulse $X_1$ is in-phase with the synchronizing signal PS. The pulses $X_i$ are supplied as gate signals to the read-out circuits $F_i$. Consequently, if the instants at which the pulse CP2 is obtained are taken as $t_1, t_1', t_2', \ldots$, the read-out circuit $F_1$ derives therefrom an output such as in FIG. $7G_1$ which includes the signal portions $S_1, S_1, S_5, S_5, \ldots$ in the periods between the instants $t_1$ and $t_1'$, between $t_3$ and $t_3'$, between $t_5$ and $t_5'$, between $t_7$ and $t_7'$, . . . , the read-out circuits $F_2$ derives therefrom an output such as depicted in FIG. $7G_2$ which includes the signal portions $S_2, S_2, S_6, S_6, \ldots$ in the periods between the instants $t_3'$ and $t_4$, between $t_5'$ and $t_6$, between $t_7'$ and $t_8$, between $t_9'$ and $t_{10}$, . . . , the read-out circuit $F_3$ an output such as shown in FIG. $7G_3$ which includes the signal portions $S_3, S_3, S_7, S_7, \ldots$ in the periods between the instants $t_4$ and $t_4'$, between $t_6$ and $t_6'$, between $t_8$, and $t_8'$, between $t_{10}$ and $t_{10}'$, . . . and the read-out circuit $F_4$ derives therefrom an output such as shown in FIG. $7G_4$ which includes the signal portions $S_4, S_4, S_8, S_8, \ldots$ in the periods between the instants $t_4'$ and $t_5$, between $t_6'$ and $t_7$, between $t_8'$ and $t_9$, between $t_{10}'$ and $t_{11}$, . . . .

The outputs thus derived from the read-out circuits $F_1$ to $F_4$, shown in FIGS. $7G_1$ to $7G_4$ are combined together to provide a time compressed aural signal SB such as depicted in FIG. 7H which includes the signal portions $S_1, S_1, S_2, S_3, \ldots$ in the periods between the instants $t_1$ and $t_1'$, between $t_3$ and $t_3'$, between $t_3'$ and $t_4$, between $t_4$ and $t_4'$, . . . .

Such an aural signal SB as shown in FIG. 7H, which is obtained with the time base compressor 2 of the above-described construction, is applied to the aforementioned transmitting circuit 16 and the transmitting circuit 16 is controlled with an interrupted signal PQ from the interrupted control signal generator circuit 18 such as shown in FIG. 7I which turns off between the instants $t_1$ and $t_3$, between $t_5$ and $t_7$, . . . and turns on between the instants $t_3$ and $t_5$, between $t_7$ and $t_9$, . . . , thereby providing transmitted radio waves RS (shown by an arrangement of the aural signal) such as depicted in FIG. 7J which are obtained from the time base compressed aural signal SB.

It will be understood that when the transmitted waves RS thus obtained are received by the receiving circuit 22 through the antenna 21, the receiving circuit 22 derives therefrom a time compressed aural signal SC of such an aural signal arrangement as depicted in FIG. 9A.

Figure 8:
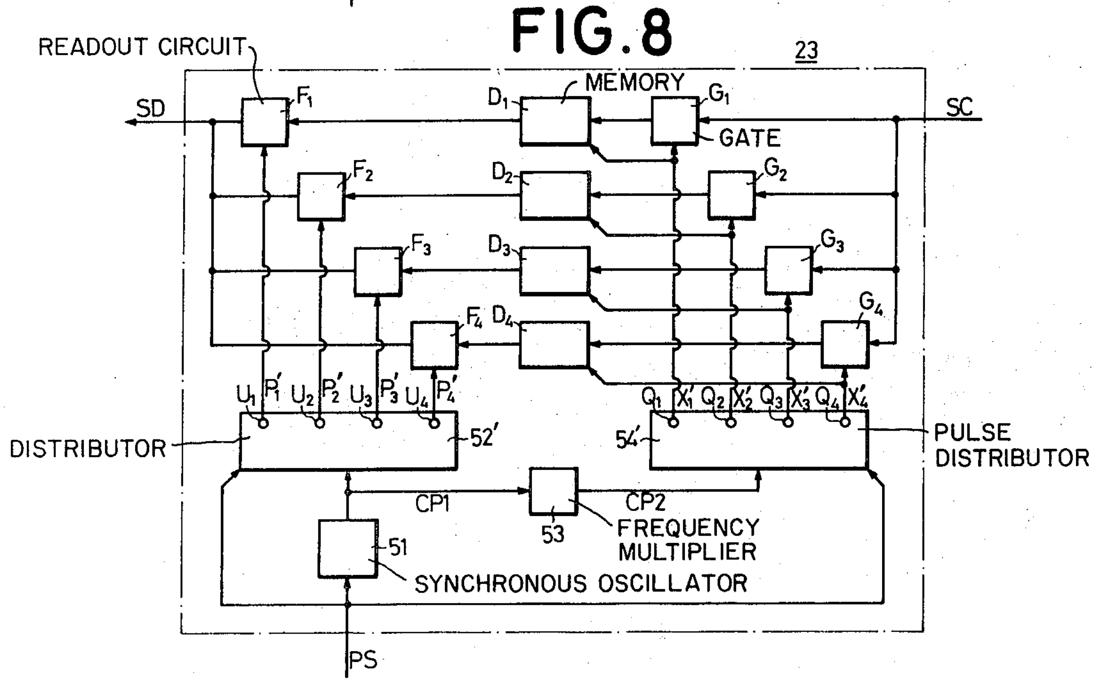
FIG. 8 is a connection diagram illustrating another example of the time base expander.
Figure 7:
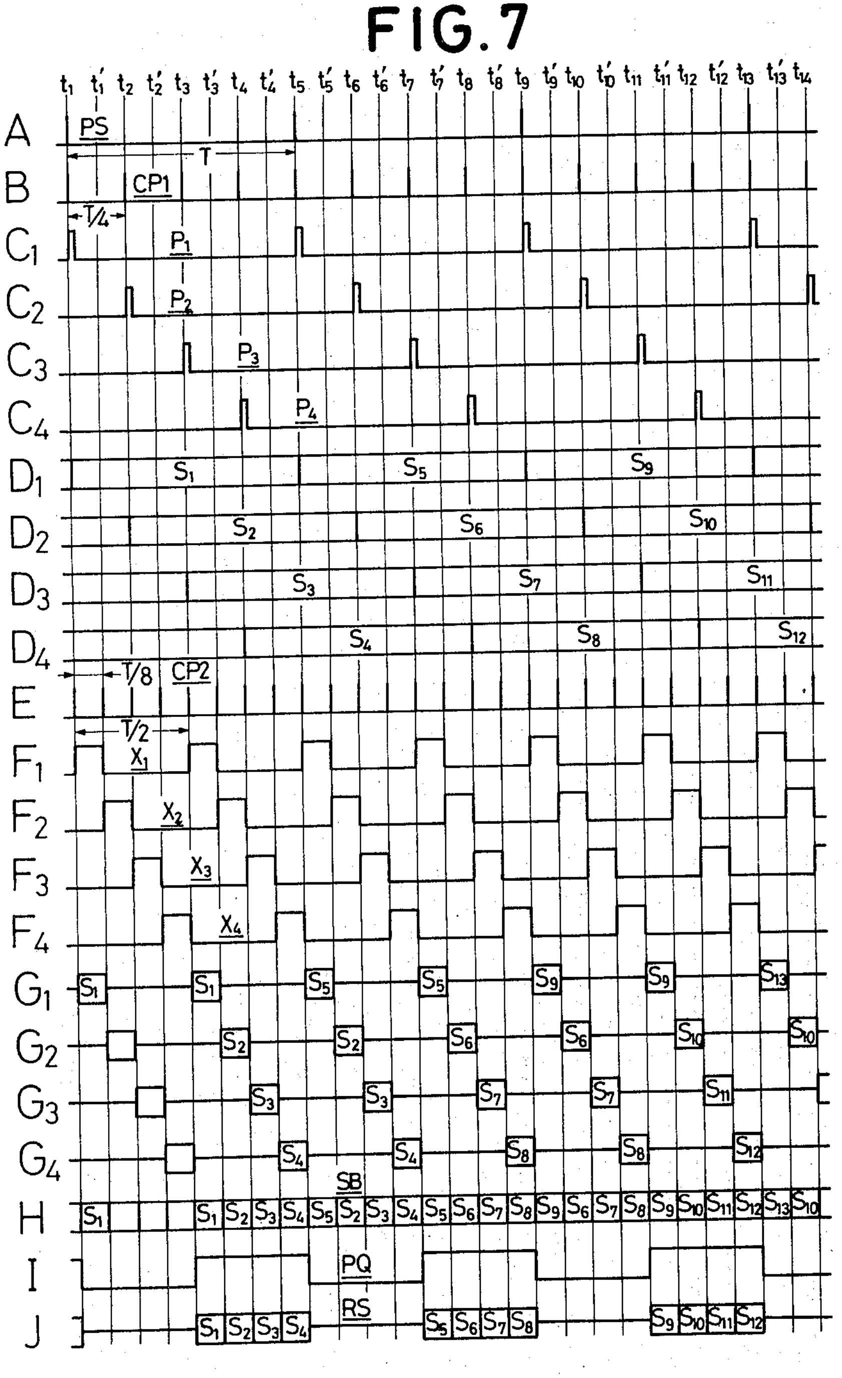
FIG. 7 shows signal arrangements, for explaining the time base compressor of FIG. 6.
Figure 9:
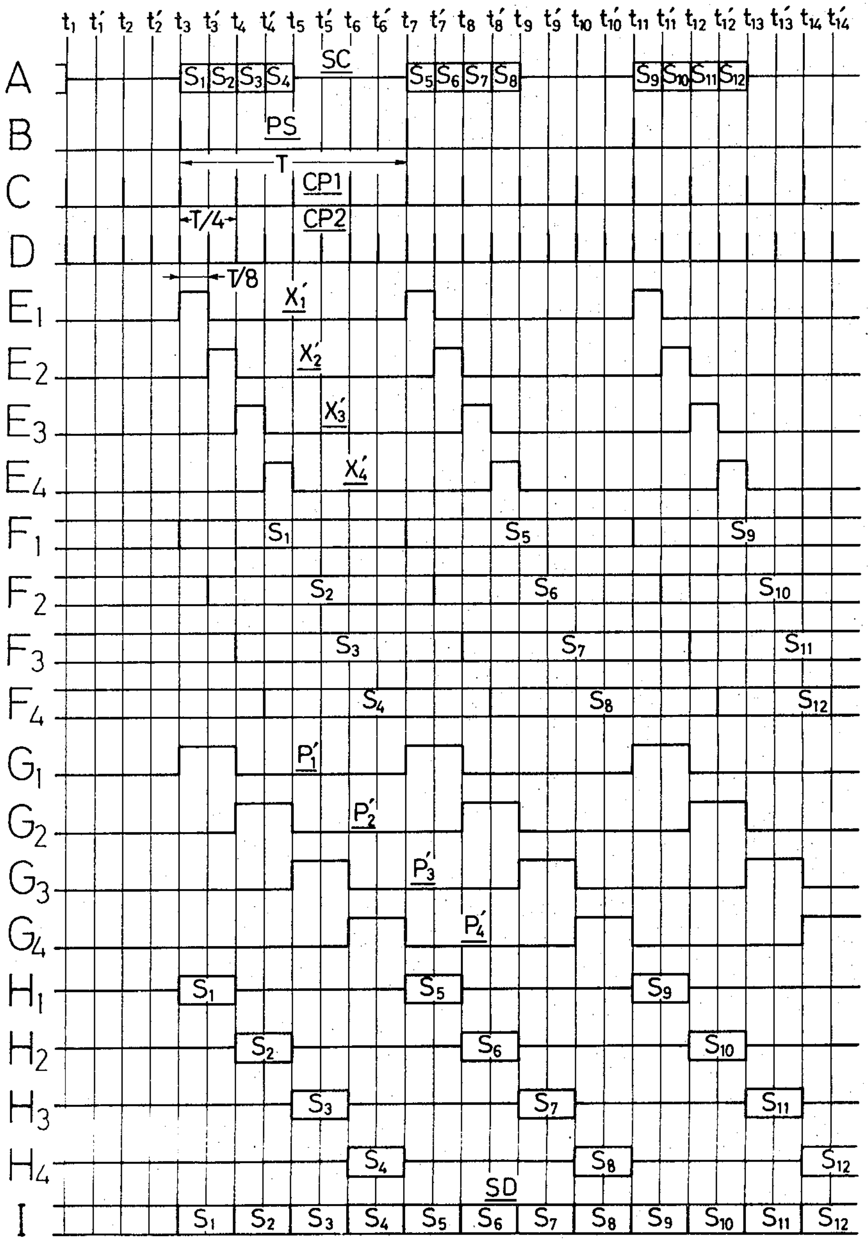
FIG. 9 shows signal arrangements, for explaining the time base expander of FIG. 8.

FIG. 8 illustrates another example of the time expander 23 for time expansion of the aural signal SC thus obtained, in which parts corresponding to those in FIG. 6 are identified by the same reference numerals and in which the aural signal SC is applied to gate circuits $G_1$ to $G_4$. While, the synchronous oscillator circuit 51 supplied with a synchronizing signal PS of FIG. 9B (which is displaced 180° apart in phase from the synchronizing signal PS of FIG. 7A as will become apparent from the following description) derives therefrom a pulse CP1 such as depicted in FIG. 9C and the frequency multiplier circuit 53 derives therefrom a pulse CP2 such as shown in FIG. 9D, which is supplied to a pulse distributing circuit 54′ together with the synchronizing signal PS, thus providing at its output terminals $Q_1$, $Q_2$, $Q_3$ and $Q_4$ pulses $X_1'$, $X_2'$, $X_3'$ and $X_4'$ of the period T such as shown in FIGS. $9E_1$, $9E_2$, $9E_3$ and $9E_4$ which have a pulse width T/8 and are sequentially displaced T/8 apart in phase. The pulses $X_i'$ are applied as gate signals to the gate circuits $G_i$. The signal portions $S_i$, $S_{(i+4)}$, $S_{(i+8)}$, . . . of the aural signal SC pass through the gate circuits $G_i$ and are stored in the memory circuits $D_i$ which are reset by the pulses $X_i$. Accordingly, the memory circuit $D_1$ stores therein the signal portions $S_1$, $S_5$, . . . in the periods between the instants $t_3$ and $t_7$, between $t_7$ and $t_{11}$, . . . as shown in FIG. $9F_1$, the memory circuit $D_2$ stores therein the signal portions $S_2$, $S_6$, . . . in the periods between the instants $t_3'$ and $t_7'$, between $t_7'$ and $t_{11}'$ as depicted in FIG. $9F_2$, the memory circuit $D_3$ stores therein the signal portions $S_3$, $S_7$, . . . in the periods between the instants $t_4$ and $t_8$, between $t_8$ and $t_{12}$, . . . as shown in FIG. $9F_3$ and the memory circuit $D_4$ stores therein the signal portions $S_4$, $S_8$, . . . in the periods between the instants $t_4'$ and $t_8'$, between $t_8'$ and $t_{12}'$, . . . as depicted in FIG. $9F_4$.

Further, the read-out circuits $F_i$ are connected to the memory circuits $D_i$. While, the pulse CP1 from the synchronous oscillator 51 is supplied to the pulse distributing circuit 52′ to derive at its output terminals $U_i$ pulses $P_i'$ of the period T such as shown in FIGS. $9G_i$ which have a pulse width T/4 and are sequentially displaced T/4 apart in phase and these pulses $P_i'$ are applied as gate signals to the read-out circuits $F_i$. Consequently, the read-out circuit $F_1$ derives therefrom an output such as shown in FIG. $9H_1$ which includes the signal portions $S_1$, $S_5$, . . . in the periods between the instants $t_3$ and $t_4$, between $t_7$ and $t_8$, . . . , the circuit $F_2$ derives therefrom an output such as depicted in FIG. $9H_2$ which includes the signal portions $S_2$, $S_6$, . . . in the periods between the instants $t_4$ and $t_5$, between $t_8$ and $t_9$, . . . , the circuit $F_3$ derives therefrom an output such as shown in FIG. $9H_3$ which includes the signal portions $S_3$, $S_7$, . . . in the periods between the instants $t_5$ and $t_6$, between $t_9$ and $t_{10}$, . . . and the circuit $F_4$ derives therefrom an outout such as depicted in FIG. $9H_4$ which includes the signal portions $S_4$, $S_8$, . . . in the periods between the instants $t_6$ and $t_7$, between $t_{10}$ and $t_{11}$, . . . .

The outputs thus derived from the read-out circuits $F_1$ to $F_4$, shown in FIGS. $9H_1$ to $9H_4$, are combined together to provide a continuous aural signal SD such as depicted in FIG. 9I that the aural signal SC is time expanded and which includes the signal portions $S_1$, $S_2$, $S_3$, . . . in the periods between the instants $t_3$ and $t_4$, between $t_4$ and $t_5$, between $t_5$ and $t_6$, . . . .

The foregoing has clarified the construction of one example of the radio stations $TR_1$ and $TR_2$. In the present invention, the interrupted radio waves RS (hereinafter identified by RS1 and RS2) obtained with the radio stations TR1 and TR2 are of the same frequency channel and the transmitted radio waves RS1 and RS2 are synchronized with each other so that they are interrupted in opposite relation to each other and the radio stations are designed such that the interrupted radio waves RS transmitted from the antenna of each station may be received by its receiving circuit 22. To this end, in each of the radio stations TR1 and TR2, one part of the radio waves RS received by the receiving circuit 22 or the output SC therefrom is supplied to the aforementioned synchronizing signal generator circuit 11 to derive therefrom a synchronizing signal PS having detected the interrupting positions of the transmitted waves RS and the synchronizing signal PS is applied to the time base compressor 2, the time base expander 23 and the interrupted control signal generator circuit 18 to control their driving synchronously, as described previously. Further, an interrupted control signal generator 25, which is identical with that 18 for the transmitting circuit 16, is connected to the receiving circuit 22 and this circuit 25 is also controlled by the synchronizing signal PS to provide the same interrupted control signal PQ′ described previously with regard to FIGS. 4C and 7I. In this case, however, the synchronizing signals PS in the radio stations TR1 and TR2 are displaced 180° apart in phase, as will be seen from the arrangements shown in FIGS. 7A and 9B. The interrupted control signals PQ and PQ′ derived from the interrupted control signal generators 18 and 25 are interrupted in opposite phases. Further, the interrupted control signals PQ obtained with the interrupted control signal generator circuits 18 in the two radio stations respectively are also interrupted in reverse phases.

Figure 5:
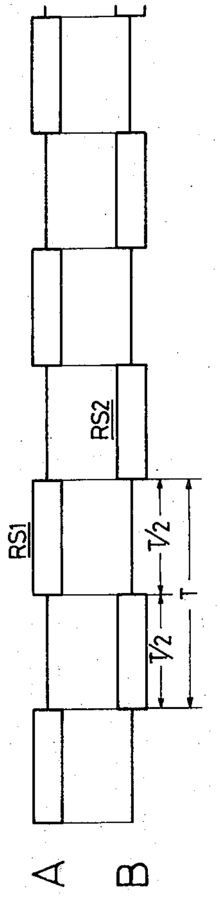

The foregoing has described the construction of one example of this invention. With such a construction, where the interrupted radio waves RS1 obtained in the radio station TR1 are of such a signal arrangement as depicted in FIG. 5A, the interrupted radio waves RS2 in the radio station TR2 are obtained in such a relation that they are in the on-state in the off-state periods of the interrupted radio waves RS1 as shown in FIG. 5B and the receiving circuits 22 of the both radio stations TR1 and JR2 operate in the on-state periods of the interrupted radio waves RS2 and RS1 respectively. Further, since the transmitted radio waves RS1 and RS2 contain the contents of the aural signals SA in the radio stations TR1 and TR2 respectively (where the time base compressor 2 shown in FIGS. 2 and 3 is employed, the transmitted radio waves contains the entire contents of the aural signals SA and where the time base compressor 2 of FIG. 6 is used, the radio waves contain the sampled contents of the aural signals), the aural signals SA of the radio stations TR2 and TR1 can simultaneously obtained in the radio stations TR1 and TR2. The present invention uses one radio frequency channel common to the two radio stations, and hence has such a great feature that the demand for simultaneous transmission and reception of aural signals between two radio stations with one radio frequency channel can be satisfactorily filled.

Although the present invention has been described as being applied to the simultaneous radiotelephone system, the invention is also applicable to the case where other desired information is simultaneously transmitted and received between two radio stations.

It will be apparent that many modifications and variations may be effected without departing from the scope of the novel concepts of this invention.

I claim as my invention:

1. A simultaneous radio communication system between first and second radio stations, each of said first and second radio stations comprising:

a. a continuous aural signal source;

b. a synchronizing signal generator;

c. a time base compressor controlled by a synchronizing signal from said synchronizing signal generator to compress a first continuous aural signal from said continuous aural signal source to provide a time base compressed aural signal;

d. a first interrupted control signal generator controlled by the synchronizing signal from said synchronizing signal generator to generate a first interrupted control signal;

e. a transmitting circuit controlled by the first interrupted control signal from said first interrupted control signal generator to convert the time base compressed aural signal from said time base compressor into an interrupted radio wave of a predetermined frequency channel;

f. a transmitting antenna for transmitting the interrupted wave from said transmitting circuit;

g. a receiving antenna for receiving the interrupted radio wave transmitted from said transmitting antenna of the other radio station;

h. a second interrupted control signal generator controlled by the synchronizing signal from said synchronizing signal generator to generate a second interrupted control signal;

i. a receiving circuit for converting the interrupted radio wave from said receiving antenna into an interrupted aural signal; and j. a time base expander controlled by the synchronizing signal from said synchronizing signal generator to expand the interrupted aural signal from the receiving circuit to provide a second continuous aural signal; in which said synchronizing signal generator of each of said first and second radio stations is adapted to obtain the synchronizing signal from the interrupted aural signal derived from said receiving circuit; the synchronizing signal is composed of pulse waves indicative of the instants when the interrupted aural signal is put in its on-state or/and off-state; the first and second control signals derived from said first and second control signal generators of each of said first and second radio stations are rectangular waves opposite in phase to each other and the first control signals derived from said first control signal generators of said first and second radio stations are opposite in phase to each other, whereby the interrupted radio waves obtained in said first and second radio stations bear such relationship that the on-state period of one of them corresponds to the off-state period of the other and the interrupted aural signals obtained in said first and second radio stations bear such relationship that the on-state period of the former corresponds to the off-state period of the latter; said time base compressor of each of said first and second radio stations is adapted so that, in the on-state period (or the off-state period) of the first interrupted control signal, the time base compressed aural signal derived from said time base compressor may be obtained as a signal produced by time base compressing all the components of the first continuous aural signal without any dropout and overlapping thereof; and said time base expander of each of said first and second radio stations is adapted so that the second continuous aural signal derived therefrom may have the same content as the first continuous aural signal.

* * * * *